(12) United States Patent
Kamath et al.

(10) Patent No.: US 8,225,192 B2
(45) Date of Patent: Jul. 17, 2012

(54) EXTENSIBLE CACHE-SAFE LINKS TO FILES IN A WEB PAGE

(75) Inventors: Rajesh Kamath, Redmond, WA (US); Randy D. Thomson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1251 days.

(21) Appl. No.: 11/590,151

(22) Filed: Oct. 31, 2006

(65) Prior Publication Data

US 2008/0104198 A1 May 1, 2008

(51) Int. Cl.
  *G06F 17/28* (2006.01)
(52) U.S. Cl. ............................................. 715/205
(58) Field of Classification Search .................. 715/205; 707/6
  See application file for complete search history.

(56) References Cited

U.S. PATENT DOCUMENTS

| | | | |
|---|---|---|---|
| 6,868,439 B2 | 3/2005 | Basu et al. | |
| 7,058,704 B1 | 6/2006 | Mangipudi et al. | |
| 7,069,497 B1 * | 6/2006 | Desai ............................ | 715/205 |
| 2003/0140143 A1 | 7/2003 | Wolf et al. | |
| 2003/0158955 A1 | 8/2003 | Minear et al. | |
| 2004/0122910 A1 | 6/2004 | Douglass et al. | |
| 2005/0071766 A1* | 3/2005 | Brill et al. ...................... | 715/738 |
| 2005/0188055 A1 | 8/2005 | Saletore | |
| 2005/0210152 A1 | 9/2005 | Hawes | |
| 2005/0216554 A1 | 9/2005 | Meiman et al. | |
| 2006/0095917 A1 | 5/2006 | Black-Ziegelbein et al. | |
| 2006/0179123 A1 | 8/2006 | Smith | |

OTHER PUBLICATIONS

Internetworking Technologies Handbook, "Network Caching Technologies", Date: Unknown, pp. 53:1-53:16; http://www.cisco.com/universalcd/cc/td/doc/disintwk/ito_doc/net_cach.pdf#search=%22cache%20cluster%20server%20farm%2Bpdf%22.
Burns, et al., "Efficient Data Distribution in a Web Server Farm", Date: Jul./Aug. 2001, pp. 56-65, http://www.ssrc.ucs.edu/~darrell/Papers/IC-Burns-01.pdf#search=%22Efficient%20Data%20Distribution%20in%20a%20Web%20Server%20Farm.%22.
Oracle Corporation, "Caching In on the Enterprise Grid Turbo-Charge Your Applications with OracleAS Web Cache—An Oracle Technical White Paper", Date: Sep. 2005, pp. 1-34, http://www.oracle.com/technology/products/ias/web_cache/pdf/WebCache1012_two.pdf#search=%22cache%20cluster%20server%20farm%2Bpdf%22.
Fielding et al., Jun. 1999, *Hypertext Transfer Protocol—HTTP/1.1*, 114 Pages.

* cited by examiner

*Primary Examiner* — Laurie Ries
*Assistant Examiner* — Tionna Smith
(74) *Attorney, Agent, or Firm* — Merchant & Gould

(57) ABSTRACT

Linking content and functionality files in a cached client-side web page to a corresponding server-side web page is provided so that a client-side browsing application is notified of changes made to the server-side web page to allow the client-side browsing application to retrieve a server-side web page or server-side web page items only when changes are made to the server-side web page or corresponding server-side web page items.

16 Claims, 3 Drawing Sheets

EXTENSIBLE CACHE-SAFE LINKS TO FILES IN A WEB PAGE

BACKGROUND OF THE INVENTION

With the advent of the Internet, web pages and associated content are obtained by client-side browsing applications from one or more servers via a distributed computing system or a network. The content and/or functionality of a given web page, for example, JavaScript files or stylesheet files, are obtained from a server, but are typically cached on the client-side computer for future use. Thus, when a previously cached web page is browsed, the client-side browsing application may render the cached page without the need for requesting the page from the server. When a given piece of web page content or functionality is changed on the server, the client-side browsing application must invalidate the cached web page and obtain a revised version of the web page from the server. Without a means for informing the client-side browsing application that the server-side web page or associated content or functionality has changed, the client-side browsing application must obtain the web page from the server each time the web page is browsed. Such "round-tripping" between the client-side and the server-side each time a web page is browsed is very inefficient and time consuming.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing extensible cache-safe links to files (content and functionality) associated with a web page. When a web page is returned by a server, dynamic links are generated for associated content, such as JavaScript files or stylesheet files and these links are returned as part of the web page. A hash value is generated for each dynamic link that provides a unique identification for such associated content. When the web page is received at a client-side browsing application, the web page, including any dynamic links and associated hash values, is cached locally for subsequent use. If a patch, upgrade or other change is made to any of the associated web page items (content and/or functionality files) at the server, the dynamic links to the changed items are revised to include new hash values. When the web page is subsequently browsed by the client-side browsing application, the browsing application follows the associated dynamic links to obtain the changed version of the associated content or functionality items. Thus, the client-side browsing application is only required to obtain server-side web page content or functionality items when those items have been changed at the server.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
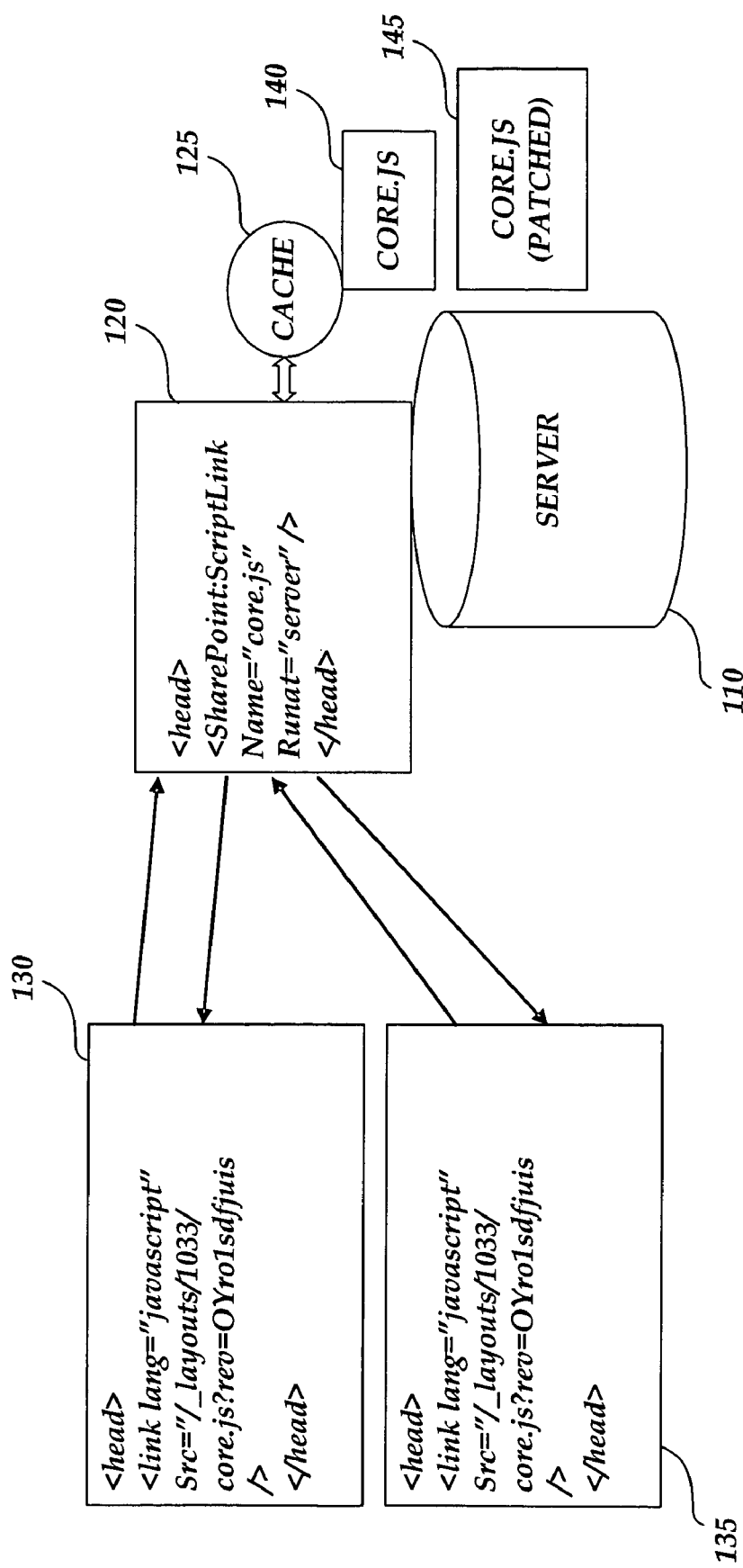
FIG. 1 is a simplified block diagram illustrating a relationship between client-side web pages and server-side web pages and associated content or functionality.

As briefly described above, embodiments of the present invention are directed to implicitly notifying a client-side browsing application when changes are made to server-side web page functionality and content so that the client-side browsing application only retrieves functionality and content from the server side when changes are made to the server-side functionality and content. In the following detailed description, references are made to the accompanying drawings that form a part hereof, and in which are shown, by way of illustrations, specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, aspects of the present invention and an exemplary computing operating environment will be described.

FIG. 1 is a simplified block diagram illustrating a relationship between client-side web pages and server-side web pages. As illustrated in FIG. 1, a server 110 is provided on which one or more web pages 120 may be stored for retrieval by one or more client-side browsing applications as client-side web pages 130, 135. According to embodiments, the server 110 may be a single free-standing server, such as a WINDOWS SHAREPOINT® SERVER (WSS) manufactured by MICROSOFT CORPORATION of Redmond, Wash., or the server 110 may be representative of associated web servers comprising a collection of web servers (also known as, a web farm or a collection of front-end ("FE") servers). As should be appreciated by those skilled in the art, the web page 120 may be stored at a single server 110 or simultaneously in two or more associated servers 110 in a web farm of servers.

As is understood by those skilled in the art, a given web page 120 may include many web page items, including a variety of content and/or functionality items. For example, the web page may be structured for providing information on a variety of topics or for allowing interaction with client-side users of the web page 120. Content associated with the web page 120 may include news information, weather information, sales information, community services information, and the like. A variety of functionalities may be associated with the web page 120 for providing various resources via the web page 120. For example, a web page 120 for online product ordering may include a functional resource in the page that ties prices to sale items. For another example, a resource may be available in a given web page 120 for providing a date, time and a connection to an online weather resource. For another example, a resource may be provided in a web page 120 that may dictate the layout of a web page.

As should be appreciated, while certain text content and images contained in a given web page 120 may change frequently, for example, news content and images, weather information, photographs, and the like, other resources associated with the web page 120 may be changed infrequently.

For example, functions that render dates, functions that dictate layout of the web page, functions that link portions of the web page to other online resources, and the like, may be changed very infrequently. That is, while certain content associated with the web page 120, for example, news information, may be revised at the server 110 on a frequent basis, other content, for example, a resource associated with the web page 120 that dictates the layout of a web page 120, may only be changed on a very infrequent basis, for example, once per year.

According to embodiments of the present invention, server controls may be provided in the web page 120 that render dynamic links to content and/or functionality items associated with the web page 120, and a unique hash value key may be provided for each dynamic link for easily distinguishing between different versions of a given web page item. When the server-side web page 120 is rendered as a client-side web page 130, 135, the client-side browsing application may cache the client-side web pages 130, 135 along with the dynamic links and associated hash values for the content items and/or functionality items associated with the web pages. If a particular content or functionality item associated with the server-side web page 120, for example, the core.js file 140, is changed at the server 110, for example, by the upload of a patch 145 to the core.js file, a revised hash value may be applied to the dynamic link associated with the changed content and/or functionality item.

When a subsequent browsing action causes the client-side browsing application to request the server-side web page 120 from the server 110, the hash values associated with content items and/or functionality items contained associated with the server-side web page 120 may be compared to the cached hash values for the client-side web pages 130, 135. If the hash values in the server-side web page 120 differ from the cached hash values in the client-side web pages 130, 135 for any web page items, then the client-side browsing application may request the changed web page items, for example, the patched core.js file 140, from the server 110. According to one embodiment, "new" hash values are not literally compared to "old" hash values by the browsing application. For each link to server-side content or functionality, the browsing application checks to see if the link exists in client cache. As long as a given link stays the same (no change in URL of link, for example), the browsing application will use the cached content or functionality. On the other hand, if content or functionality has changed on the server-side, then a revised ("new") hash value will cause the generation of a new associated link. The browsing application will see the new link and will not find a matching entry in the client-side cache because all client-side cache entries are referred to or "keyed-off" the link value. When the browsing application does not find the cached entry, it will fetch (or, re-fetch) the content or functionality from the server side associated with the revised or new link. Thus, the client-side browsing application is implicitly "notified" when server-side content items and/or functionality items have changed so that the client-side browsing application may obtain the changed web page items from the server 110 without fetching all content items and/or functionality items from the server 110 each time the web page 130, 135 is browsed on the client-side.

According to one embodiment, when the client-side browsing application learns that one or more content items and/or functionality items have been changed at the server 110, the browsing application may request only those changed items from the server 110 for updating the previously cached client-side web pages 130, 135. Alternatively, when the client-side browsing application learns that one or more content items or functionality items associated with the server-side web page 120 have been changed, as described above, the client-side browsing application requests the entire server-side web page 120 along with any changed static page content items and/or functionality items.

The following represents and example implementation of an embodiment of the present invention and is intended for purposes of example only and is not limiting of other implementations of embodiments of the invention. According to an example implementation, Hypertext Markup Language (HTML) pages in a WSS server contain links to static pages, such as JavaScript (JS) and cascading stylesheets (CSS) that are also served up by the server 110 in response to a browsed web page 120. A simple example of such a page as seen by the browsing application 30 might appear as follows.

```
<HTML>
<HEAD>
<Link type="text/javascript"
    language="javascript"
    src="/_layouts/1033/styles/core.js" />
</HEAD>
<BODY>
.....
</BODY>
</HTML>
```

When this markup is processed by the browsing application 30, the browsing application asks the server 110 for a copy of core.js, and the browsing application then caches the copy of core.js at the client computing device 2 (described below with reference to FIG. 3). Subsequent browses to the same web page will leverage the cached copy of the JS file and avoid making a round trip to the server. However, if the server copy of core.js is patched or otherwise modified, the browsing application must be notified to retrieve the modified file from the server.

As described above, a dynamic link is rendered to the JS file (e.g., core.js) by using a special server control in the page as follows.

```
<HTML>
<HEAD>
<SharePoint:ScriptLink name="core.js" runat="server" />
</HEAD>
<BODY>
.....
</BODY>
</HTML>
```

Upon executing this page, an example HTML markup returned by the server 110 to the browsing application 30 may appear as follows.

```
<HTML>
<HEAD>
<Link type="text/javascript"
    language="javascript"
    src="/_layouts/1033/styles/core.js?rev="hashvalue1" />
</HEAD>
<BODY>
.....
</BODY>
</HTML>
```

This file is cached by the browsing application 30 with a key equal to "/_layouts/1033/styles/core.js?rev="hashvalue1". According to an embodiment the value "hashvalue1" is a deterministic one-way hash of the entire contents of the file (e.g., core.js) that is computed with any suitable hash value algorithm. One suitable hashing algorithm is the well known MD5 hashing algorithm. This process of assigning a unique hash value to a given web item file ensures that all identical FE server machines in a web farm will compute the same revision (rev) value (hash value); assuming that the patched file is the same on each server.

When the file (e.g., core.js) is patched or otherwise changed on the server, the server 110 returns new markup, such as the example markup that follows.

```
<HTML>
<HEAD>
<Link type="text/javascript"
    language="javascript"
    src="/_layouts/1033/styles/core.js?rev="hashvalue2"/>
</HEAD>
<BODY>
.....
</BODY>
</HTML>
```

As illustrated, after the patch to the subject web page file the hash value is recomputed for the file from rev="hashvalue1" to rev="hashvalue2." When the browsing application detects the change in the hash value for the subject web page file, the browsing application 30 then re-fetches the file (e.g., patched core.js) since the uniform resource locator (URL) used for the cache key no longer matches any client-side cache entry. That is, when a file changes at the server 110, the hash value changes automatically and deterministically which allows the client-side browsing application 30 to know to re-fetch the affected file. To avoid re-computing the hash value for every request, a server-side cache 125 may be implemented for storing the hash values, keyed by the file identifier. The advantage of using a server control to render the hashed dynamic link is that any third party or solution provider may generate links to their web page files and participate in the same extensible framework. Additionally, since the page itself does not contain the link (that is, the link is rendered by the server control), no pages must change when the targets of the links (web page content and/or functionality items) are changed.

Figure 2:
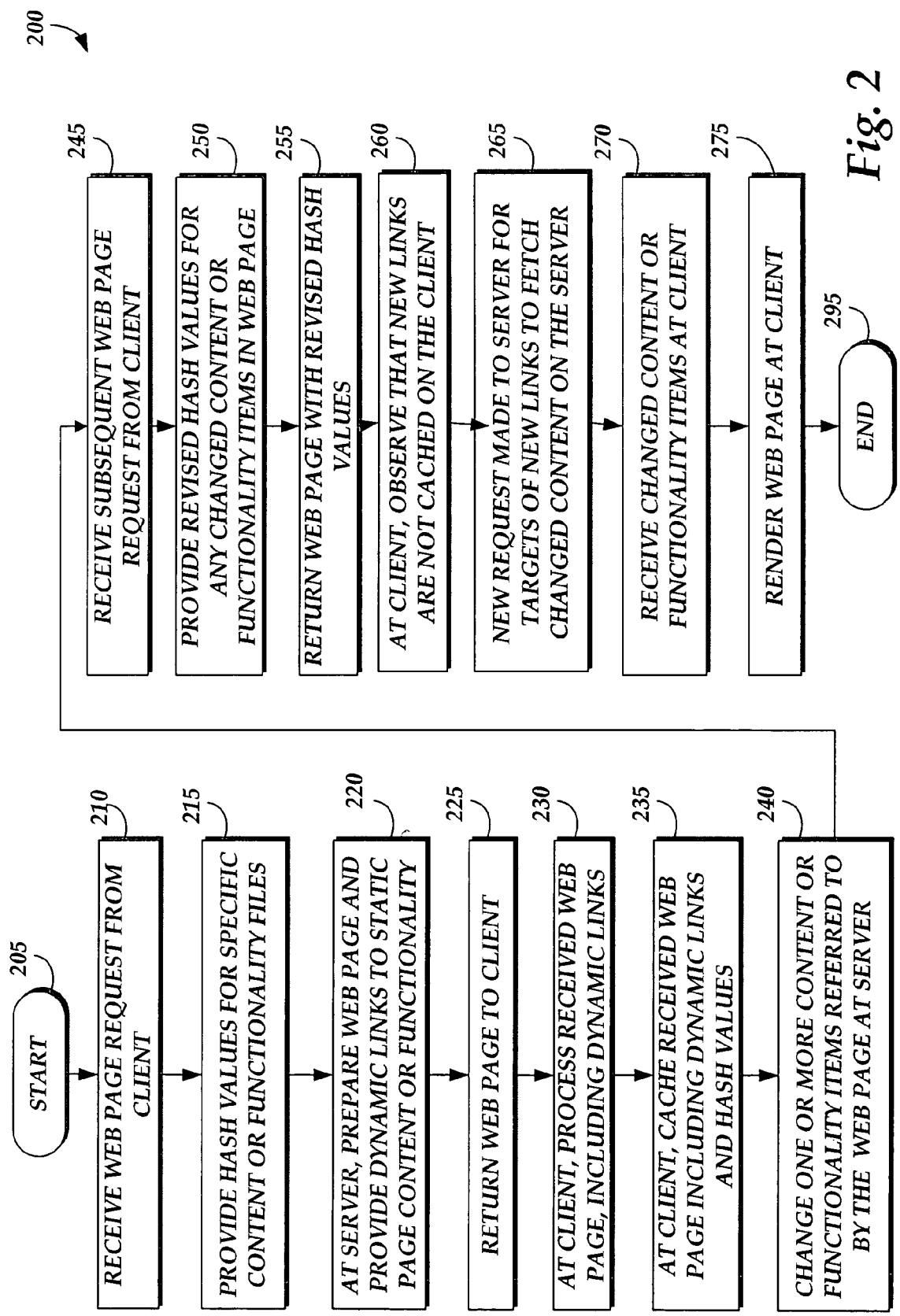
FIG. 2 is a logical flow diagram illustrating a method for providing information to a client-side browsing application regarding the revision status of a client-side cached web page.

FIG. 2 is a logical flow diagram illustrating a method for providing information to a client-side browsing application regarding the revision status of a client-side cached web page. The method 200 begins at start operation 205 and proceeds to operation 210 where a web page request for the web page 120 is received from a client-side browsing application 30 at the web page server. At operation 215, hash values are generated for each of the static page content items or functionality items at the web page server for which dynamic links are generated at operation 220.

At operation 220, a server-side web page 120 is created or prepared at the server 110, as described above with reference to FIG. 1. When the server-side web page 120 is created, dynamic links to static web page content, for example, JavaScript or a cascading stylesheets files, or other static content and/or functionality items are generated. As should be appreciated, the request for the server-side web page 120 is the result of a browsing action where the URL for the web page 120 is entered via a client-side browsing application manually or by selecting a link to the desired web page 120. At operation 230, at the client-side, the server-side web page 120 is received, and the content and/or functionality items (e.g., JS or CSS files) associated with the web page 120 are processed, including any dynamic links to particular static page content items or functionality items associated with the web page. At operation 235, the client-side web pages 130, 135 are rendered by the client-side browsing application, and the content items and functionality items associated with the client-side web pages 130, 135 are cached on local computing devices 2, described below with reference to FIG. 3. According to embodiments, unique hash values generated for the dynamic links to particular static page content items or functionality items are cached along with the web pages 130, 135.

At operation 240, changes are made to one or more content or functionality items associated with the server-side web page 120 at the server 110. As should be appreciated, if the server 110 is representative of a farm of associated web servers, changes to particular content items and/or functionality items are made simultaneously to identical files on each of the servers 110 contained in the web farm. As described above, a change made to one or more content or functionality items may be in the form of a patch or other revision to a static page item, for example, a JavaScript file or cascading stylesheet file.

At operation 245, a subsequent request is received from the client-side browsing application 30 for the web page 120 contained at the server 110. At operation 250, a revised hash value is computed for the modified web page item, as described above. At operation 260, the client-side browsing application observes that a revised or new link is associated with the requested web page 120, where the revised or new link corresponds to a changed content or functionality item associated with the server-side web page 120. At operation 265, the browsing application automatically requests the content or functionality item corresponding to the revised or new link (e.g., core.js file) from the server.

At operation 270, the requested file(s) is/are received at the client-side browsing application and is/are cached along with other content items and/or functionality items of the requested web page 120 at the local computing device 2 for subsequent use. At operation 275, the requested web page along with changed, updated or otherwise modified content items and/or functionality items is rendered by the client-side browsing application. The method ends at operation 295.

Exemplary Computing Environment

Figure 3:
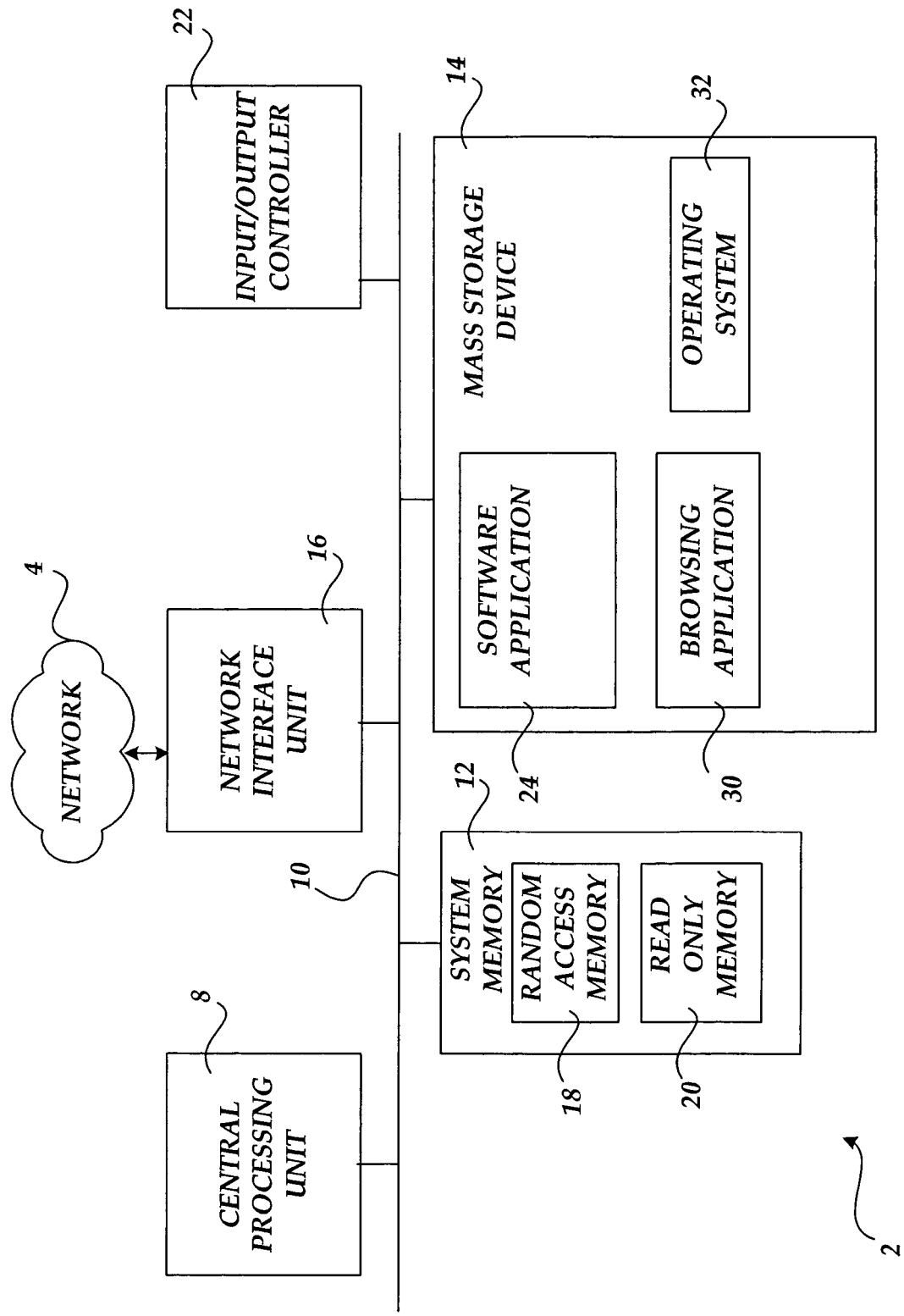
FIG. 3 illustrates an exemplary computing operating environment in which embodiments of the present invention may be practiced.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS® operating systems from MICROSOFT CORPORATION of Redmond, Wash. The mass storage device 14 and RAM 18 may also store one or more program modules. In particular, the mass storage device 14 and the RAM 18 may store application programs, such as a software application 24, for example, a word processing application, a spreadsheet application, etc. As illustrated in FIG. 1, a browsing application is provided for browsing to and displaying web pages described herein. An example browsing application 30 is INTERNET EXPLORER® from MICROSOFT CORPORATION.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method of linking content and/or functionality files in a cached client-side web page to a corresponding server-side web page, comprising:

providing a web page referring to one or more web page items, the one or more web page items comprising a static web page;

associating with the web page one or more server controls that render dynamic links to the one or more web page items, the dynamic links comprising at least one link to a revised version of the static web page;

providing a hash value for each dynamic link rendered in the web page;

at a client-side browsing application, caching, in a client-side cache, the web page, wherein caching the web page comprises caching each dynamic link rendered in the web page and the hash value provided for each dynamic link, wherein caching the web page further comprises caching a file comprising a key equal to the hash value;

in response to a revision to the web page, revising the hash values for any dynamic link associated with a changed web page item, wherein revising the hash values for any dynamic link associated with a change web page item comprises generating a revised dynamic link associated with each of the revised hash values;

implementing a server-side cache for storing the hash values keyed by a file identifier for the web page to avoid re-computing the hash values for each of a plurality of web page file requests;

in response to a browsing action, receiving at the client-side browsing application the revised web page having the revised dynamic link associated with each of the revised hash values;

determining that a matching link entry for the revised dynamic link does not exist in the client-side cache;

fetching at least one of content and functionality associated with the revised dynamic link from the server-side; and if any dynamic link associated with a revised hash value is not present in the client-side cache, caching the revised web page at the client-side, and using the cached revised web page for subsequent browses to the web page at the client side.

2. The method of claim 1, whereby caching the revised web page at the client-side, and using the cached revised web page for subsequent browses to the web page at the client side includes caching any web page items in the cached web page with corresponding changed web page items in the revised web page.

3. The method of claim 1, prior to caching the web page at the client-side browsing application, further comprising:
   requesting the web page at a client-side browsing application; and
   receiving the web page at the client-side browsing application.

4. The method of claim 1, wherein providing a web page having one or more web page items includes providing a web page having one or more web page content items.

5. The method of claim 1, wherein providing a web page having one or more web page items includes providing a web page having one or more web page functionality items.

6. The method of claim 1, wherein providing a web page having one or more web page items includes providing a web page having one or more JavaScript files.

7. The method of claim 1, wherein providing a web page having one or more web page items includes providing a web page having one or more cascading stylesheet files.

8. A computer readable storage device containing computer executable instructions which when executed by a computer perform a method of linking web page items in a server-stored web page with corresponding web page items in a separately cached web page, comprising:
   providing at a server a web page having one or more web page items, the one or more web page items comprising a static web page;
   associating with the web page one or more server controls that render dynamic links to the one or more web page items, the dynamic links comprising at least one link to a revised version of the static web page;
   providing a hash value for each dynamic link rendered in the web page;
   caching, in a client-side cache, a copy of the web page at a storage medium separate from the server, wherein caching a copy of the web page comprises caching each dynamic link rendered in the web page and the hash value provided for each dynamic link, wherein a copy of the web page further comprises caching a file comprising a key equal to the hash value;
   receiving a revision to the web page and revising the hash values for any dynamic link associated with a changed web page item;
   implementing a server-side cache for storing the hash values keyed by a file identifier for the web page to avoid re-computing the hash values for each of a plurality of web page file requests;
   generating revised dynamic links for any changed web page items;
   in response to a browsing action, receiving at the separate storage medium the revised web page having the revised dynamic links associated with any changed web page items;
   determining that a matching link entry for the revised dynamic links does not exist in the client-side cache;
   fetching at least one of content and functionality associated with the revised dynamic links from the server-side; and
   if any dynamic links associated with any revised web page items are not present in the cached copy of the web page, replacing any web page item in the cached copy of the web page with a corresponding changed web page item that is associated with the revised hash value and a corresponding revised dynamic link.

9. The computer readable storage device of claim 8, wherein the server comprises a collection of associated web servers and wherein providing at a server a web page having one or more web page items includes providing the web page having one or more web page items at each server of the collection of web servers.

10. The computer readable storage device of claim 9, wherein in response to receiving a revision to the web page, applying the revision to the web page provided at each server of the collection of web servers.

11. The computer readable storage device of claim 10, wherein revising the hash values for any dynamic link associated with a changed web page item includes revising the hash values for any dynamic link associated with a changed web page item in each web page provide at each server of the collection of web servers.

12. The computer readable storage device of claim 8, wherein replacing any web page item in the cached copy of the web page with a corresponding changed web page item that is associated with the revised hash value and a corresponding revised dynamic link further comprises replacing the cached copy of the web page with the revised web page.

13. The computer readable storage device of claim 8, wherein providing at a server a web page having one or more web page items includes providing a web page having one or more JavaScript files.

14. The computer readable storage device of claim 8, wherein providing at a server a web page having one or more web page items includes providing a web page having one or more cascading style sheet files.

15. A computer readable storage device containing computer executable instructions which when executed by a computer perform a method of linking web page items in a server-stored web page with corresponding web page items in a separately cached web page, comprising:
   providing at a server a web page having one or more web page items, the one or more web page items comprising a static web page;
   associating with the web page one or more server controls that render dynamic links to the one or more web page items, the dynamic links comprising at least one link to a revised version of the static web page;
   providing a hash value for each dynamic link rendered in the web page;
   caching, in a client-side cache, a copy of the web page at a storage medium separate from the server, wherein caching a copy of the web page comprises caching each dynamic link rendered in the web page and the hash value provided for each dynamic link, wherein a copy of the web page further comprises caching a file comprising a key equal to the hash value;
   receiving a revision to the web page and revising the hash values for any dynamic link associated with a changed web page item;
   implementing a server-side cache for storing the hash values keyed by a file identifier for the web page to avoid re-computing the hash values for each of a plurality of web page file requests;
   in response to a browsing action, receiving at the separate storage medium the revised web page having the revised hash values for any dynamic link associated with any changed web page items;

determining that a matching link entry for the revised dynamic links does not exist in the client-side cache; and fetching at least one of content and functionality associated with the revised dynamic links from the server-side.

16. The computer readable storage device of claim 15, wherein the server comprises a collection of associated web servers and wherein providing at a server a web page having one or more web page items includes providing the web page having one or more web page items at each server of the collection of web servers.

* * * * *